United States Patent
Park

(10) Patent No.: US 8,734,063 B2
(45) Date of Patent: May 27, 2014

(54) CUTTING TOOL ASSEMBLY FOR STABLE COUPLING STRUCTURE

(75) Inventor: Hong Sik Park, Daegu (KR)

(73) Assignee: Taegutec, Ltd., Daegu (KR)

( * ) Notice: Subject to any disclaimer, the term of this patent is extended or adjusted under 35 U.S.C. 154(b) by 169 days.

(21) Appl. No.: 13/394,890

(22) PCT Filed: Sep. 8, 2009

(86) PCT No.: PCT/KR2009/005087
§ 371 (c)(1),
(2), (4) Date: Mar. 8, 2012

(87) PCT Pub. No.: WO2011/030936
PCT Pub. Date: Mar. 17, 2011

(65) Prior Publication Data
US 2012/0170983 A1    Jul. 5, 2012

(51) Int. Cl.
*B23B 31/10* (2006.01)
*B23B 31/11* (2006.01)

(52) U.S. Cl.
USPC .............................. 407/40; 407/101

(58) Field of Classification Search
USPC .................... 407/40, 101; 409/234
See application file for complete search history.

(56) References Cited

U.S. PATENT DOCUMENTS

| | | | |
|---|---|---|---|
| 4,073,160 A | | 2/1978 | Perret |
| 5,425,603 A | * | 6/1995 | Dutschke et al. ............... 407/40 |
| 5,551,811 A | | 9/1996 | Satran et al. |
| 5,957,631 A | | 9/1999 | Hecht |
| 6,276,879 B1 | | 8/2001 | Hecht |
| 6,599,050 B1 | * | 7/2003 | Sjoo ................................ 403/97 |
| 6,880,437 B2 | * | 4/2005 | Sjoo et al. ....................... 82/158 |
| 7,112,021 B2 | * | 9/2006 | Pantzar ......................... 409/234 |
| 7,703,359 B2 | * | 4/2010 | Englund ....................... 82/1.11 |
| 2005/0268760 A1 | | 12/2005 | Erickson |

FOREIGN PATENT DOCUMENTS

KR    10-2009-0008596    1/2009

OTHER PUBLICATIONS

Official Action dated May 29, 2013 issued in Chinese counterpart application (No. 200980161371.5).
Search Report dated May 29, 2013 issued in Chinese counterpart application (No. 200980161371.5).
International Search Report in PCT/KR2009/005087, dated Jun. 8, 2010.
Written Opinion in PCT/KR2009/005087, dated Jun. 8, 2010.

* cited by examiner

*Primary Examiner* — Will Fridie, Jr.
(74) *Attorney, Agent, or Firm* — Womble Carlyle Sandridge & Rice, LLP

(57) ABSTRACT

A cutting tool assembly includes a cutting head having a coupling face provided with a multilateral recess, a shank having a coupling face provided with a multilateral recess corresponding to that of the cutting head, and a multilateral coupling plate which fits complementarily into the interior space created by the multilateral recesses. The cutting tool assembly provides a more stable coupling structure, since rotational torque is transmitted through the multilateral coupling plate from the shank to the cutting head, whereas in the prior art coupling screws are used to directly bear the torque force.

20 Claims, 2 Drawing Sheets

CUTTING TOOL ASSEMBLY FOR STABLE COUPLING STRUCTURE

RELATED APPLICATIONS

This is a 35 USC 371 U.S. National Phase of International Application No. PCT/KR2009/005087 filed 08 Sep. 2009 and published in English as WO 2011/030936A1 on 17 Mar. 2011. The contents of the aforementioned application are incorporated by reference in its entirety.

TECHNICAL FIELD

This disclosure is related to coupling of a cutting tool assembly for rotation.

BACKGROUND ART

A conventional rotating tool holder disclosed in CH 692 449 includes a cutting head and a shank, which has two mating pins. The mating pins transmit rotational torque with the help of a locking bolt. However, the pins are not easy to disassemble and may be broken during machining.

Other conventional modular type boring bars do not have any structural elements for torque transmission. Therefore, the coupling screws directly bear the stress resulting from the boring rotation, and are vulnerable to breakage.

SUMMARY

The present disclosure aims to provide a cutting tool assembly having a stable coupling structure and a longer tool life. The present disclosure also aims to provide a cutting tool assembly having an interior coolant channel and a leak-tight contact surface between a cutting head and a shank.

A cutting tool assembly according to the present disclosure comprises a cutting head having a flat coupling face provided with a multilateral recess, a shank having a flat coupling face provided with a multilateral recess corresponding to that of the cutting head, and a multilateral coupling plate fit complementarily into the interior space created by both of the multilateral recesses.

In the cutting tool assembly according to the present disclosure, the multilateral coupling plate may have a central opening and be secured to the multilateral recess of the shank by a fixing screw which passes through the central opening thereof.

In the cutting tool assembly according to the present disclosure, the central opening of the multilateral coupling plate is provided with a shoulder on which the head of the fixing screw rests.

In the cutting tool assembly according to the present disclosure, the fixing screw may have a wrench recess in its head.

In the cutting tool assembly according to the present disclosure, the shank may have a coolant channel passing through a rotational axis thereof, the cutting head may have a coolant channel, and the fixing screw may have a coolant bore passing through the central axis thereof such that a coolant path is formed all the way through the shank, the coupling plate, and the cutting head.

In the cutting tool assembly according to the present disclosure, the wrench recess and the coolant bore may be aligned coaxially.

In the cutting tool assembly according to the present disclosure, the head and the shank may be provided with screw holes corresponding to each other so that coupling screws are engaged to secure the head to the shank.

In the cutting tool assembly according to the present disclosure, the shank may be provided with an extra screw hole, which corresponds to a screw hole of a cutting head for the other handed boring rotation.

The cutting tool assembly in accordance with this disclosure provides a more stable coupling structure, since rotational torque is transmitted through the multilateral coupling plate from the shank to the cutting head, whereas in the prior art coupling screws are used to directly bear the torque force.

In the present technique in accordance with the present disclosure, the shank and the head are allowed to be made of more rigid materials so as to have a longer tool life.

In the present technique in accordance with the present disclosure, contact between the shank and the head is made much better so as to be leak-tight.

The present technique in accordance with the present disclosure is adaptable for a shank of a much smaller diameter for small diameter boring.

DETAILED DESCRIPTION

Hereinafter, a cutting tool holder assembly according to embodiments of the present disclosure is described. The figures attached to the present disclosure are merely for convenience of explanation, and the shapes and the relative scales may be exaggerated or abridged.

Figure 1:
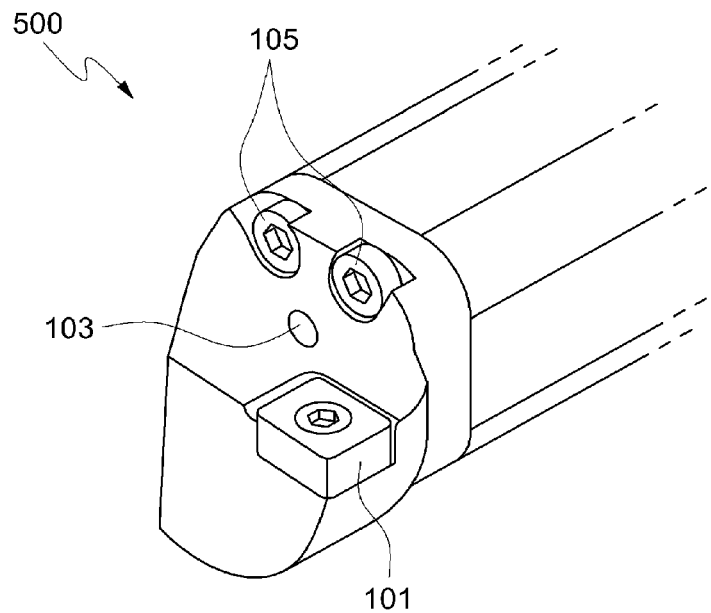
FIG. 1 is a perspective view depicting the cutting tool assembly in accordance with the present disclosure.
Figure 2:
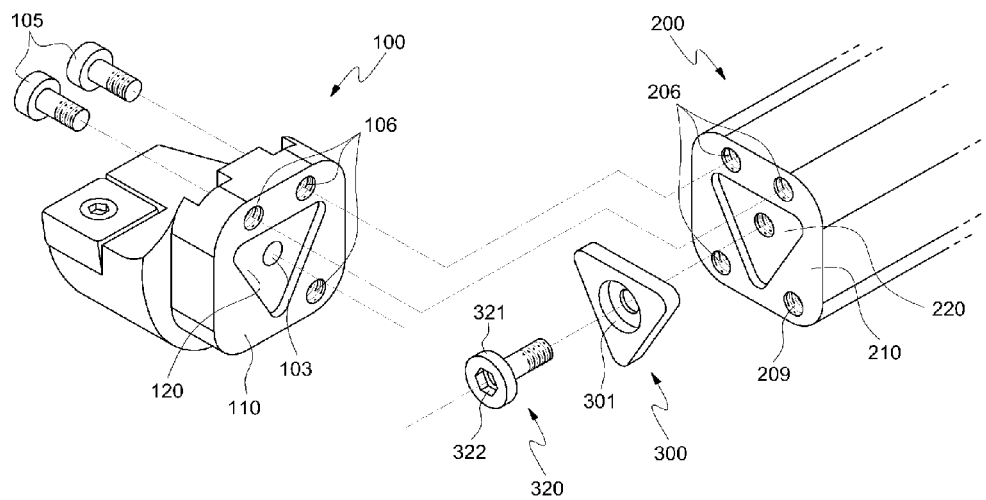
FIG. 2 is a disassembled perspective view of the cutting tool assembly of FIG. 1.
Figure 3:
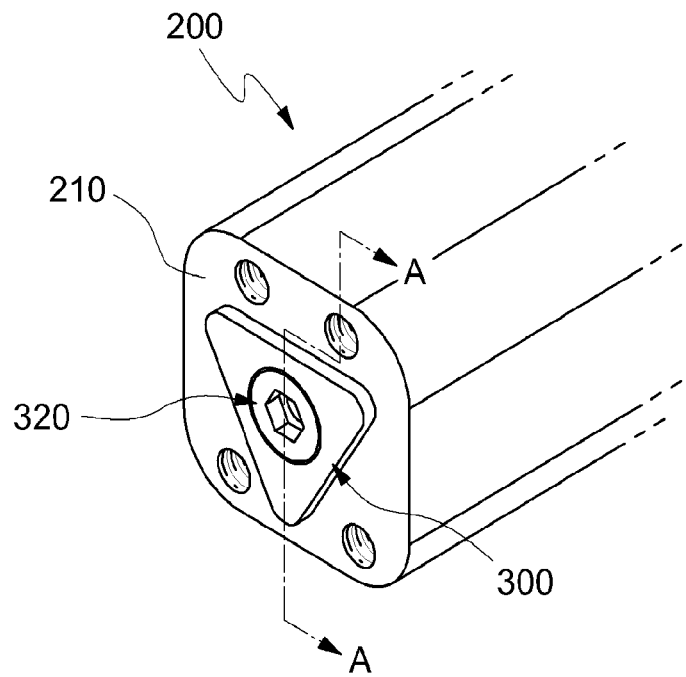
FIG. 3 is a perspective view of the shank to which the multilateral coupling plate is secured by a fixing screw in accordance with the present disclosure.
Figure 4:
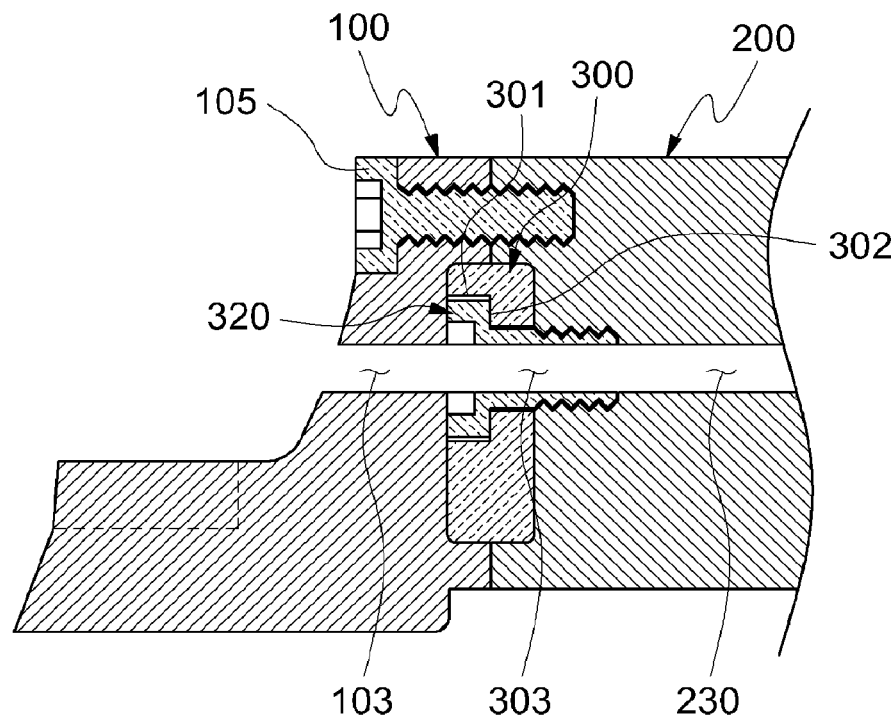
FIG. 4 is a cross sectional view of the cutting tool assembly cut along the line A-A shown in FIG. 3.

FIG. 1 is a perspective view depicting the cutting tool assembly in accordance with the present disclosure. FIG. 2 is a disassembled perspective view of the cutting tool assembly of FIG. 1. FIG. 3 is a perspective view of the shank to which the multilateral coupling plate is secured by a fixing screw. FIG. 4 is a cross sectional view of the cutting tool assembly cut along the line A-A shown in FIG. 3.

The cutting tool assembly includes a cutting head 100 carrying a cutting insert 101 and having a flat coupling face 110 provided with a multilateral recess 120, a shank 200 having a flat coupling face 210 provided with a multilateral recess 220 corresponding to that of the cutting head 100, and a multilateral coupling plate 300 fit complementarily into the interior space created by both of the multilateral recesses 120,220. The multilateral coupling plate 300 and the multilateral recesses 120,220 above generally have polygonal shapes such as trilateral or quadrilateral, but also include other torque transmittable shapes such as a star or shapes having a curved or undulating periphery.

The multilateral coupling plate 300 has a central opening 301 and is secured to the multilateral recess 220 of the shank 200 by a fixing screw 320 which passes through the central opening 301 of the multilateral coupling plate 300.

The central opening 301 of the multilateral coupling plate 300 is provided with a shoulder 302 on which the head of the fixing screw 320 rests. The fixing screw 320 may have a wrench recess 322 in its head. The wrench recess herein includes a driver groove.

The shank 200 has a coolant channel 230 passing through a rotational axis thereof, and the cutting head 100 also has a coolant channel 103 corresponding to that of the shank 200. The fixing screw 320 has a coolant bore 303 passing through the central axis thereof so that a coolant path is formed all the way through the shank 200, the coupling plate 300, and the cutting head 100. The wrench recess 322 and the coolant bore 303 are aligned coaxially in the fixing screw 320.

The head 100 and the shank 200 are provided with screw holes 106, 206 corresponding to each other. When the head 100 is matched to the shank 200 with the coupling plate 300 interposed therebetween, coupling screws 105 are engaged into the screw holes 106, 206 to secure the head 100 to the shank 200.

FIGS. 1 and 2 depict a right-handed rotational cutting head. The shank 200 may be provided with an extra screw hole 209 on the flat coupling face 210, which does not correspond to any of the screw holes 106 of the head 100. However, this extra screw hole 209 may be used for a left-handed rotational cutting head which has a screw hole corresponding to the extra screw hole 209. The shank 200 with this extra screw hole 209 allows ambidextrous adaptability for right-handed and left-handed cutting heads.

In the cutting tool assembly in accordance with this disclosure, rotational torque is transmittable through the multilateral coupling plate 300 from the shank 200 to the head 100 so that coupling screws 105 do not directly bear the torque force and the coupling is much more stable structurally.

Since the coupling plate is replaceable when it wears out, the shank and the head are allowed to be made of more rigid materials than that of the coupling plate so as to have a longer tool life.

Since the multilateral coupling plate 300 is detachable, the flat coupling faces of the shank 200 and the head 100 can be machined flat with ease and contact between the shank 200 and the head 100 is much better so as to be leak-tight.

Since the coolant path is formed through the central axis of the fixing screw 320, the multilateral coupling plate 300, and the shank 200, the present technique is adaptable for a shank of a much smaller diameter for small diameter boring.

The cutting tool assembly disclosed above may have various other embodiments without departing from the basic concept of the present disclosure. Accordingly, all the disclosed embodiments must be understood as being exemplary only and must not be construed to be the limit of the present disclosure. Accordingly, the range of protection for the present disclosure must be determined not by an embodiment described hereinabove, but by the attached claims. An alternative that is equivalent to the attached claims is included in the range of protection of the attached claims.

The invention claimed is:

1. A cutting tool assembly comprising,
   a cutting head having a flat coupling face provided with a multilateral recess;
   a shank having a flat coupling face provided with a multilateral recess corresponding to that of the cutting head; and
   a multilateral coupling plate fit complementarily into an interior space created by both of the multilateral recesses, wherein
   the multilateral coupling plate has a central opening and is secured to the multilateral recess of the shank by a fixing screw which passes through the central opening thereof.

2. The cutting tool assembly according to claim 1, wherein the central opening of the multilateral coupling plate is provided with a shoulder on which a head of the fixing screw rests.

3. The cutting tool assembly according to claim 1, wherein the fixing screw has a wrench recess in its head.

4. The cutting tool assembly according to claim 1, wherein
   the shank has a coolant channel passing through a rotational axis thereof,
   the cutting head has a coolant channel, and
   the fixing screw has a coolant bore passing through a central axis thereof such that a coolant path is formed all the way through the shank, the coupling plate, and the cutting head.

5. The cutting tool assembly according to claim 4, wherein the fixing screw has a wrench recess in its head, and the wrench recess and the coolant bore are aligned coaxially.

6. The cutting tool assembly according to claim 1, wherein the cutting head and the shank are provided with screw holes corresponding to each other so that coupling screws are engaged to secure the cutting head to the shank.

7. The cutting tool assembly according to claim 6, wherein the shank is provided with an extra screw hole, which corresponds to a screw hole of a cutting head having a different-handed rotation.

8. A cutting tool assembly comprising:
   a cutting head having a head coupling face provided with a head recess;
   a shank having a shank coupling face provided with a shank recess corresponding to the head recess such that an interior space is formed between the cutting head and the shank upon abutment of the head coupling face against the shank coupling face; and
   a coupling plate configured and dimensioned to fit into the interior space when the head coupling face abuts the shank coupling face; wherein:
   the head recess, the shank recess and the coupling plate each have a torque-transmittable shape such that when the coupling plate occupies the interior space and the cutting head is secured to the shank, rotation of the shank results in a rotational torque being transmitted through the coupling plate from the shank to the cutting head, wherein:
   the coupling plate has a central opening; and
   the coupling plate is secured to the shank recess by a fixing screw which passes through the central opening.

9. The cutting tool assembly according to claim 8, wherein:
   the head coupling face and the shank coupling face are flat; and
   the head recess and the shank recess are formed in a central area of the head coupling face and the shank coupling face, respectively 10. The cutting tool assembly according to claim 8, wherein:
    the central opening of the coupling plate is provided with a shoulder on which a head of the fixing screw rests.

11. The cutting tool assembly according to claim 8, wherein
    the head is secured to the shank;
    the shank has a coolant channel passing through a rotational axis thereof,
    the cutting head has a coolant channel, and
    the fixing screw has a coolant bore passing through a central axis thereof such that a coolant path is formed all the way through the shank, the coupling plate, and the cutting head.

12. The cutting tool assembly according to claim 11, wherein
    the fixing screw has a wrench recess in its head, and the wrench recess and the coolant bore are aligned coaxially.

13. The cutting tool assembly according to claim 8, wherein:
the head coupling face has a plurality of head screw holes formed around the head recess;
the shank coupling face has a plurality of shank screw holes formed around the shank recess;
the plurality of head screw holes align with a corresponding plurality of shank screw holes, when the cutting head is in abutment with the shank.

14. The cutting tool assembly according to claim 13, wherein:
the shank is provided with an extra screw hole to allow for ambidextrous adaptability for right-handed and left-handed cutting heads.

15. The cutting tool assembly according to claim 8, wherein:
the shank is configured to be selectively secured to either a right-handed or left-handed cutting head.

16. The cutting tool assembly according to claim 8, wherein:
the cutting head and the shank are made of more rigid materials than the coupling plate.

17. The cutting tool assembly according to claim 8, wherein:
the head coupling face and the shank coupling face are flat, and the head is secured to the shank;
the shank has a coolant channel passing through a rotational axis thereof;
the cutting head has a coolant channel; and
the fixing screw has a coolant bore passing through a central axis thereof such that a coolant path is formed all the way through the shank, the coupling plate, and the cutting head.

18. The cutting tool assembly according to claim 17, wherein:
the fixing screw has a wrench recess in its head, and the wrench recess and the coolant bore are aligned coaxially; and
the central opening of the coupling plate is provided with a shoulder on which a head of the fixing screw rests.

19. A cutting tool assembly comprising:
a cutting head having a flat coupling face provided with a multilateral recess;
a shank having a flat coupling face provided with a multilateral recess corresponding to that of the cutting head; and
a multilateral coupling plate fit complementarily into an interior space created by both of the multilateral recesses, wherein
the cutting head and the shank are provided with screw holes corresponding to each other so that coupling screws are engaged to secure the cutting head to the shank.

20. A cutting tool assembly comprising:
a cutting head having a head coupling face provided with a head recess;
a shank having a shank coupling face provided with a shank recess corresponding to the head recess such that an interior space is formed between the cutting head and the shank upon abutment of the head coupling face against the shank coupling face; and
a coupling plate configured and dimensioned to fit into the interior space when the head coupling face abuts the shank coupling face; wherein:
the head recess, the shank recess and the coupling plate each have a torque-transmittable shape such that when the coupling plate occupies the interior space and the cutting head is secured to the shank, rotation of the shank results in a rotational torque being transmitted through the coupling plate from the shank to the cutting head,
the heading coupling face has a plurality of head screw holes formed around the head recess;
the shank coupling face has a plurality of shank crew holes formed around the shank recess;
the plurality of head crew holes align with a corresponding plurality of shank screw holes, when the cutting head is in abutment with the shank.

* * * * *